United States Patent [19]

Johansson et al.

[11] Patent Number: 4,472,702

[45] Date of Patent: Sep. 18, 1984

[54] WEDGING DEVICE AND TRANSFORMER INCLUDING SAME

[75] Inventors: Alf Johansson; Lars Johansson, both of Ludvika, Sweden

[73] Assignee: Asea AB, Västerås, Sweden

[21] Appl. No.: 367,389

[22] Filed: Apr. 12, 1982

[30] Foreign Application Priority Data

Apr. 15, 1981 [SE] Sweden .............................. 8102426

[51] Int. Cl.³ ............................................ H01F 27/30
[52] U.S. Cl. ............................ 336/197; 174/DIG. 8;
264/230; 403/11; 403/273; 403/409; 411/79;
411/80
[58] Field of Search .................. 403/409, 273, 30, 11,
403/28, 29; 285/381, DIG. 10; 411/75, 79, 80;
264/230, 342 R; 174/DIG. 8; 336/210, 197;
310/214; 254/88, 104

[56] References Cited

U.S. PATENT DOCUMENTS

| | | | |
|---|---|---|---|
| 1,435,265 | 11/1922 | Thompson | 336/197 |
| 1,832,616 | 11/1931 | Brown | 336/197 |
| 2,810,869 | 10/1957 | Cottle, Jr. | 336/197 X |
| 3,139,468 | 6/1964 | Wheat | 285/381 X |
| 3,156,885 | 11/1964 | Koza | 336/197 |
| 4,296,955 | 10/1981 | Martin | 285/381 |

FOREIGN PATENT DOCUMENTS

| | | | |
|---|---|---|---|
| 1267173 | 6/1961 | France | 336/197 |
| 133933 | 9/1919 | United Kingdom | 336/197 |

Primary Examiner—Thomas J. Kozma
Attorney, Agent, or Firm—Watson, Cole, Grindle & Watson

[57] ABSTRACT

A wedging device comprises at least two bodies which are movable in relation to each other, namely a first body having two diverging surfaces and a second body which is displaceable relative to the first body along one of its diverging surfaces. A heat-shrinkable casing, made for example from a tape, sheet or film of polymeric material, is arranged around the movable bodies of the device. When the device is heated, the casing shrinks, causing relative displacement between the first and second bodies and a consequent change in the outer dimensions of the device.

10 Claims, 4 Drawing Figures

WEDGING DEVICE AND TRANSFORMER INCLUDING SAME

TECHNICAL FIELD

This invention relates to a wedging device. In particular, but not exclusively, it relates to a wedging device for use between an iron core and a surrounding winding of an electric transformer or between concentric windings of a transformer.

BACKGROUND ART

In the manufacture of liquid-insulated, electric transformers, it is the usual practice to arrange gaps for the passage of an electrically-insulating liquid, for example oil, between parts having different potentials, such as between a winding and an iron core or between two windings. In such gaps there are normally provided spaced-apart barriers made from sheets of pressboard, the transformer insulation thus being built up from pressboard sheets with intermediate gaps. The most common method of achieving the necessary distances between the pressboard sheets is to arrange ribs of pressboard between the sheets. If the barriers are cylindrical, such as when they are arranged between two windings or between a winding and an iron core located inside the winding, the ribs are arranged parallel to the axis of the barriers. The ribs may be glued or tied, for example with tape, to a sheet of pressboard with which they make contact. Between the ribs there are formed spaces through which, during operation of the transformer, the oil or other insulating liquid is caused to pass for cooling the transformer.

During assembly of such a transformer, the creation of plays between the ribs and adjacent pressboard sheets cannot be avoided. When the transformer is subsequently dried out, by suitable heating, prior to the introduction of transformer oil or other insulating liquid, the insulating materials shrink, resulting in the creation of further small plays between the ribs and adjacent pressboard sheets and enlargement of the already existing plays.

In the event of a short-circuit arising in such a transformer, radially and axially directed forces occur in the windings. In a winding which closely surrounds a core leg, the radial forces are directed inwardly towards the core leg. These forces thus tend to reduce the diameter of the winding, and if the winding is not sufficiently resistant or well stayed, it will break or its diameter will be reduced. In a winding which is located further away from the core leg, the forces are in a direction away from the core leg. These forces tend to increase the diameter of such a winding, which may lead to damage, for example displacement of its terminals.

One aim of the present invention is to provide a wedging device which makes possible a considerably improved staying of an electric transformer and, therefore, a considerably improved resistance to damage caused by short-circuit forces. To this end the invention provides a wedging device which, after having been mounted in its intended position, may, without further handling, be caused to increase its dimensions in a desired direction. If wedging devices of this kind are used instead of the above-described ribs, or instead of some of these ribs, in the manufacture of a transformer, the wedging devices, after assembly of the transformer parts, may be caused to increase their dimensions in the radial direction of the transformer windings. In this way it can be ensured that the windings are securely stayed, with no play, by the wedging devices. However, the wedging device in accordance with the invention is also suitable for purposes other than the staying of transformer windings. For example, it may be used for staying, in an analagous manner, the windings of reactors and for staying or wedging of objects in spaces which are not readily accessible.

DISCLOSURE OF THE INVENTION

According to the invention, a wedging device comprises at least two bodies which are movable relative to each other, namely a first body with two diverging surfaces and a second body, which is displaceable relative to the first body, along one of its diverging surfaces, and a heat-shrinkable casing which is arranged around the bodies of the device, which casing, when heated, causes relative displacement between said first and second bodies to effect a change in the outer dimensions of the device.

The heat-shrinkable casing may with advantage consist of a wrapping around the relatively movable bodies of the device of tape or sheet having the ability to shrink when heated. Such a tape or sheet may be woven from fibers of polymeric material, for example fibers of polyethylene glycol terephthalate, polyamide, acrylonitrile resin, polyvinylidene chloride or polypropylene. It is also possible to use films or hoses of the exemplified polymeric materials with the ability to shrink when heated. During the application of the wedging device, it is heated to a temperature which is sufficient to effect shrinkage of the material in the shrinkable casing.

When wedging devices in accordance with the invention are used in barriers for transformers or reactors or in other devices in which electrical insulation is an important consideration, the movable bodies of the wedging device may be made of electrically-insulating material, for example pressboard, glass fiber-reinforced polyester resin, paper laminate with phenolformaldehyde resin binder, a thermoplastic such as a polycarbonate or a polyimide, or wood. When the wedging device does not constitute any part of an electrical insulation system, but fulfils a merely mechanical task, the movable bodies may be made of a metallic material.

Wedging devices in accordance with the invention may be of different shapes depending on their intended uses. When included in barriers for the purpose of staying the windings of transformers or reactors they have an elongated shape with a length which is at least as great as that of the winding to be stayed.

BRIEF DESCRIPTION OF DRAWING

The invention will now be described in greater detail, by way of example, with reference to the accompanying drawing, wherein.

DESCRIPTION OF PREFERRED EMBODIMENTS

Figure 1:
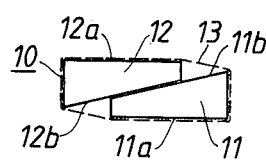
FIG. 1 is a schematic end view of one embodiment of a wedging device in accordance with the invention, in contracted condition.
Figure 2:
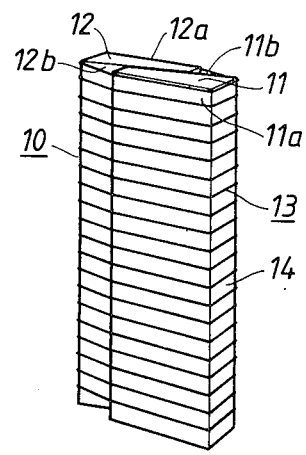
FIG. 2 is a schematic perspective view of the wedging device of FIG. 1.

The wedging device 10 shown in FIGS. 1 and 2 comprises two overlapping elongated bodies 11 and 12 of pressboard. The body 11 has two diverging surfaces 11a and 11b, respectively, and the body 12 has two diverging surfaces 12a and 12b, respectively. The bodies 11 and 12 are displaceable relative to each other along their contacting surfaces 11b and 12b. Around the bodies 11 and 12 there is wound a wrapping 13 of a heat-shrinkable tape 14, for example a tape woven from yarn of stretched polyethylene glycol terephthalate fibers.

Figure 3:
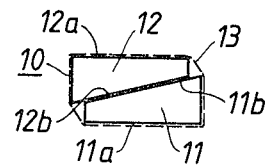
FIG. 3 is a view similar to FIG. 1, but showing the wedging device in expanded condition.

When the wedging device is sufficiently heated, the tape 14 shrinks and the bodies 11 and 12 are displaced relative to one another along the surfaces 11b and 12b until they have assumed the positions shown in FIG. 3. By this displacement the distance between surfaces 11a and 12a of the device is increased.

Figure 4:
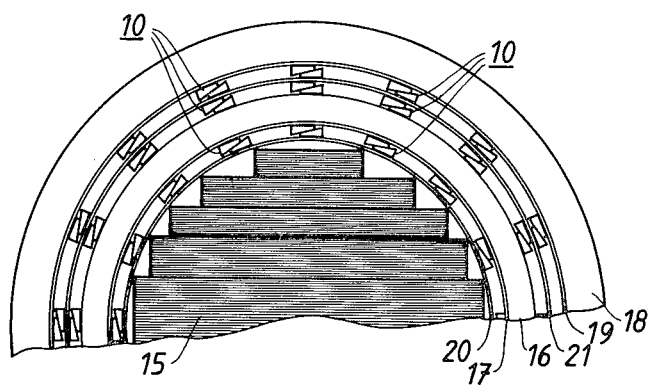
FIG. 4 is a schematic plan of part of a transformer employing wedging devices in accordance with the invention between a core leg and a winding and between two concentric windings.

FIG. 4 illustrates use of the wedging devices 10 of FIGS. 1 and 2 in a transformer which comprises a core leg 15 surrounded by a low-voltage winding 16 with a supporting, electrically-insulating cylinder 17 and a high-voltage winding 18 with a supporting, electrically-insulating cylinder 19. A thin-walled, electrically-insulating cylinder 20 is arranged inside the winding 16 and a pressboard sheet 21 is disposed in the annular gap between the cylinder 19 and the radially outer surface of the winding 16.

Between the cylinders 17 and 20 a plurality of the wedging devices 10 of FIGS. 1 and 2 are arranged in spaced-apart relationship, these wedging devices having the same length as the winding. In the same way, a plurality of the wedging devices 10 are arranged between the winding 16 and the pressboard sheet 21, and a further plurality of the wedging devices 10 are arranged between the pressboard sheet 21 and the cylinder 19. After assembly of the parts in the way, the transformer is dried at a temparature of about 130° C. for about 12 hours, and in the course of this drying procedure the tape 14 in the wrappings 13 of all the wedging devices 10 shrinks so that, at each of the wedging devices where play occurs, the distance between the surfaces 11a and 12a of the wedging device increases, as previously described with reference to FIGS. 1 and 3. This causes the windings to become stayed by the wedging devices in a manner free from play. In FIG. 4 the wrapping 13 is not shown in the wedging devices 10.

In the wedging devices 10 shown in the drawing the bodies 11 and 12 both have diverging surfaces with approximately the same angle between them in each of the bodies. It is, of course, possible in other embodiments of wedging devices in accordance with the invention for only one of the bodies to have diverging surfaces, the other body then being of parallelepipedic shape. Alternatively, both bodies of the wedging device may have diverging surfaces, the angle between these surfaces being different in the two bodies. The wedging device may, of course, comprise more than two movable bodies which are displaceable relative to each other along contacting surfaces.

What is claimed is:

1. A wedging device comprising:
   at least two bodies movable to each other, and including a first body with two substantially diverging opposing surfaces and a second body displaceable relative to said first body along one of said diverging surfaces, and
   a heat-shrinkable casing arranged around said at least two bodies, which casing, when heated, causes relative displacement between said first and second bodies to effect an increase in the outer dimensions of the device in a direction substantially transverse to said two opposing surfaces.

2. A wedging device according to claim 1, wherein said heat-shrinkable casing consists of a wrapping around said bodies of a tape or sheet of polymeric material with the ability to shrink when heated.

3. A wedging device according to claim 1, wherein said first and second bodies are made of electrically-insulating material.

4. A wedging device according to claim 2, wherein said first and second bodies are made of electrically-insulating material.

5. In an electric transformer having at least an iron core and a winding around said core, a number of wedging devices being located between said core and said winding, each said wedging device comprising:
   at least two bodies movable relative to each other, and including a first body with two substantially diverging opposing surfaces and a second body displaceable relative to said first body along one of said diverging surfaces; and
   a heat shrinkable casing arranged around said at least two bodies, said casing, when heated, causing relative displacement between said first and second bodies to effect an increase in the outer dimensions of the device in a direction substantially transverse to said two opposing surfaces.

6. The electric transformer of claim 5 wherein said first and second body are each made of electrically insulating material.

7. An electric transformer according to claim 5 or 6 wherein said heat-shrinkable casing is a wrapping wound around said first and second bodies and made of a tape or sheet of polymeric material capable of shrinking when heated.

8. In an electric transformer having at least two concentric windings, a number of wedging devices located between said concentric windings, each said wedging device comprising:
   at least two bodies movable relative to one another, and including a first body with two substantially diverging opposing surfaces and a second body displaceable relative to said first body along one of said diverging surfaces; and
   a heat-shrinkable casing arranged around said at least two bodies, said casing, when heated, casing relative displacement between said first and second bodies to effect an increase in the outer dimensions of the device in a direction substantially transverse to said two opposing surfaces.

9. The electric transformer according to claim 8 wherein said first and second body are each made of electrically insulating material.

10. An electric transformer according to claim 8 or 13 wherein said heat-shrinkable casing is a wrapping wound around said first and second bodies and made of a tape or sheet of polymeric material capable of shrinking when heated.

* * * * *